(12) United States Patent
Vranish

(10) Patent No.: US 11,067,210 B2
(45) Date of Patent: Jul. 20, 2021

(54) LOW-SPILL COUPLING ASSEMBLY

(71) Applicant: Colder Products Company, St. Paul, MN (US)

(72) Inventor: David J. Vranish, Mound, MN (US)

(73) Assignee: Colder Products Company, Roseville, MN (US)

(*) Notice: Subject to any disclaimer, the term of this patent is extended or adjusted under 35 U.S.C. 154(b) by 0 days.

(21) Appl. No.: 14/567,254

(22) Filed: Dec. 11, 2014

(65) Prior Publication Data

US 2015/0090915 A1 Apr. 2, 2015

Related U.S. Application Data

(63) Continuation-in-part of application No. 14/212,322, filed on Mar. 14, 2014, now abandoned.

(60) Provisional application No. 61/799,612, filed on Mar. 15, 2013.

(51) Int. Cl.
*F16L 37/413* (2006.01)
*F16L 37/34* (2006.01)
*F16L 27/073* (2006.01)

(52) U.S. Cl.
CPC .......... *F16L 37/413* (2013.01); *F16L 27/073* (2013.01); *F16L 37/34* (2013.01); *Y10T 137/87957* (2015.04)

(58) Field of Classification Search
CPC ....... F16L 37/413; F16L 37/36; F16L 27/073; F16L 37/34; F16L 37/32; F16L 37/30; F16L 37/0841; F16L 37/35; F16L 29/04; Y10T 137/87949; Y10T 137/87957; Y10T 137/87965; Y10T 137/87941

USPC ........... 251/149.6, 149.7, 149.8, 149.1, 149, 251/149.9; 137/614, 614.02, 614.03, 137/614.04, 614.05, 614.06
See application file for complete search history.

(56) References Cited

U.S. PATENT DOCUMENTS

| | | |
|---|---|---|
| 3,334,659 A | 8/1967 | Magorien |
| 4,079,966 A | 3/1978 | Berry et al. |
| 4,327,770 A * | 5/1982 | Brown et al. ............. 137/614.05 |
| 4,340,052 A | 7/1982 | Dennehey et al. |
| 4,447,040 A | 5/1984 | Magorian |
| 4,541,457 A * | 9/1985 | Blenkush ............ F16L 37/0841 137/614.05 |
| D298,605 S | 11/1988 | Colgan et al. |
| 4,875,711 A | 10/1989 | Watanabe |
| 4,892,117 A | 1/1990 | Spalink |

(Continued)

OTHER PUBLICATIONS

International Search Report and Written Opinion for PCT/US2014/027937 dated Jul. 8, 2014.

(Continued)

*Primary Examiner* — Craig J Price
*Assistant Examiner* — Andrew J Rost
(74) *Attorney, Agent, or Firm* — Fish & Richardson P.C.

(57) ABSTRACT

A coupling system includes a female coupling device, the female coupling device including a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; and a third seal that is positioned at the opening of the main body.

14 Claims, 17 Drawing Sheets

(56) References Cited

U.S. PATENT DOCUMENTS

| | | | |
|---|---|---|---|
| 4,919,457 A | 4/1990 | Moretti | |
| D309,774 S | 8/1990 | Lewis | |
| D313,067 S | 12/1990 | Kotake et al. | |
| 5,018,352 A | 5/1991 | Compton | |
| 5,104,158 A | 4/1992 | Meyer et al. | |
| 5,292,157 A | 3/1994 | Rubichon | |
| 5,316,041 A * | 5/1994 | Ramacier et al. | 137/614.04 |
| 5,494,074 A | 2/1996 | Ramacier et al. | |
| 5,546,985 A | 8/1996 | Bartholomew | |
| 5,709,243 A * | 1/1998 | Wells | F16L 37/23 |
| | | | 137/614.01 |
| D396,730 S | 8/1998 | Schaupp | |
| 5,911,403 A | 6/1999 | deCler et al. | |
| 5,938,244 A * | 8/1999 | Meyer | 285/305 |
| 5,975,489 A | 11/1999 | deCler et al. | |
| D419,860 S | 2/2000 | Persson | |
| 6,024,124 A | 2/2000 | Braun et al. | |
| 6,082,401 A | 7/2000 | Braun et al. | |
| 6,176,263 B1 | 1/2001 | Lacroix et al. | |
| 6,328,348 B1 | 12/2001 | Cornford et al. | |
| 6,386,596 B1 | 5/2002 | Olson | |
| D468,016 S | 12/2002 | Mosler et al. | |
| 6,517,121 B1 | 2/2003 | Cresswell | |
| 6,681,803 B2 | 1/2004 | Taneya et al. | |
| 6,685,230 B1 | 2/2004 | Bottura | |
| 7,044,161 B2 * | 5/2006 | Tiberghien | F16L 37/0841 |
| | | | 137/614.03 |
| 7,063,357 B1 | 6/2006 | Bay | |
| 7,185,674 B2 | 3/2007 | Taylor | |
| 7,213,845 B2 | 5/2007 | Sato | |
| 7,469,472 B2 * | 12/2008 | deCler et al. | 29/890.12 |
| 7,547,047 B2 | 6/2009 | deCler et al. | |
| 7,568,737 B2 | 8/2009 | Wells et al. | |
| D608,424 S | 1/2010 | Katsuta et al. | |
| D610,760 S | 2/2010 | Zugen et al. | |
| D654,573 S | 2/2010 | Lombardi et al. | |
| 7,708,029 B2 | 5/2010 | Kitagawa et al. | |
| 7,980,599 B2 | 7/2011 | Schindel | |
| D648,008 S | 11/2011 | Percoco et al. | |
| 8,201,853 B2 * | 6/2012 | Tiberghien | F16L 37/34 |
| | | | 285/376 |
| D679,784 S | 4/2013 | Meyer | |
| D687,528 S | 8/2013 | Meyer | |
| 8,764,068 B2 | 7/2014 | Frick et al. | |
| 8,870,235 B2 | 10/2014 | Turk | |
| 8,910,980 B2 | 12/2014 | Neal et al. | |
| 9,157,560 B2 | 10/2015 | Rehder et al. | |
| D752,721 S | 3/2016 | Wildfang et al. | |
| D758,555 S | 6/2016 | Van Dyke et al. | |
| D761,395 S | 7/2016 | Plackner et al. | |
| D788,890 S | 6/2017 | Downs et al. | |
| 9,689,516 B2 | 6/2017 | Frick et al. | |
| D816,211 S | 4/2018 | Guala | |
| D830,523 S | 10/2018 | Vranish | |
| D830,524 S | 10/2018 | Vranish | |
| D838,350 S | 1/2019 | Downs et al. | |
| 2005/0001425 A1 | 1/2005 | deClear et al. | |
| 2007/0029796 A1 | 2/2007 | Bibby | |
| 2007/0120361 A1 | 5/2007 | Kao | |
| 2009/0167018 A1 | 7/2009 | Lien | |
| 2010/0019487 A1 | 1/2010 | deCler et al. | |
| 2010/0051129 A1 | 3/2010 | Kitagawa | |
| 2013/0092271 A1 | 4/2013 | Downs et al. | |
| 2014/0060675 A1 | 3/2014 | Wilhelms et al. | |
| 2014/0261819 A1 | 9/2014 | Vranish | |
| 2015/0090915 A1 | 4/2015 | Vranish | |
| 2015/0267851 A1 | 9/2015 | Aoki | |

OTHER PUBLICATIONS

International Preliminary Report on Patentability in Application No. PCT/US2014/027397, dated Sep. 15, 2015, 6 pages.

* cited by examiner

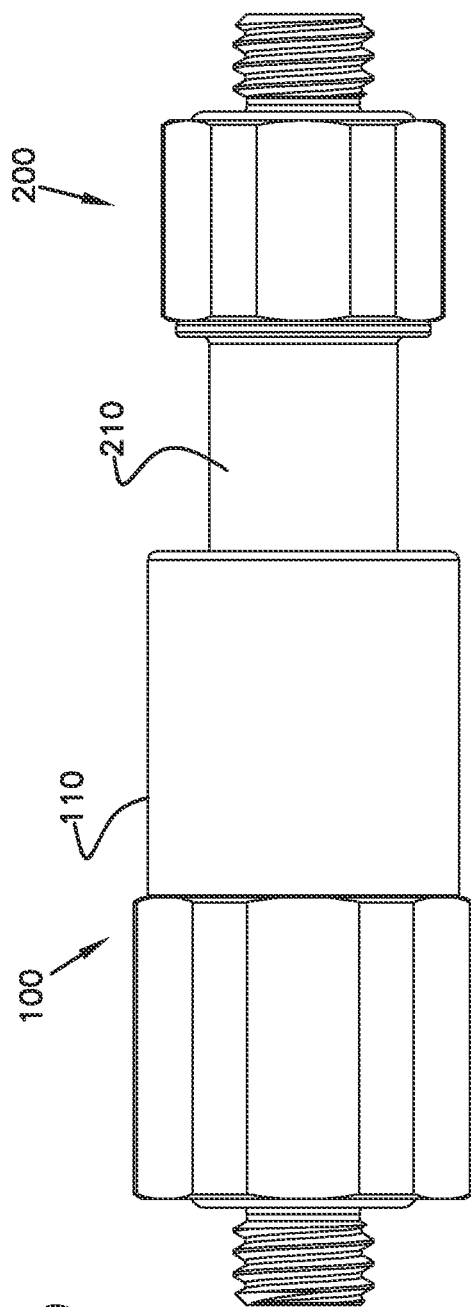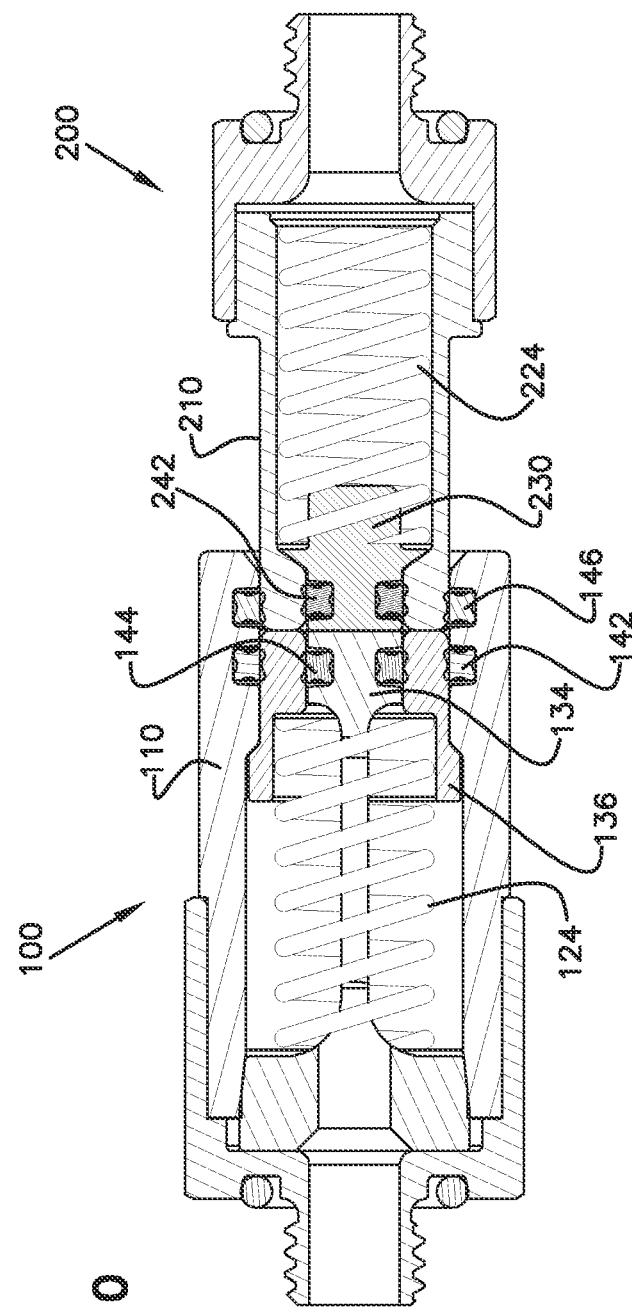

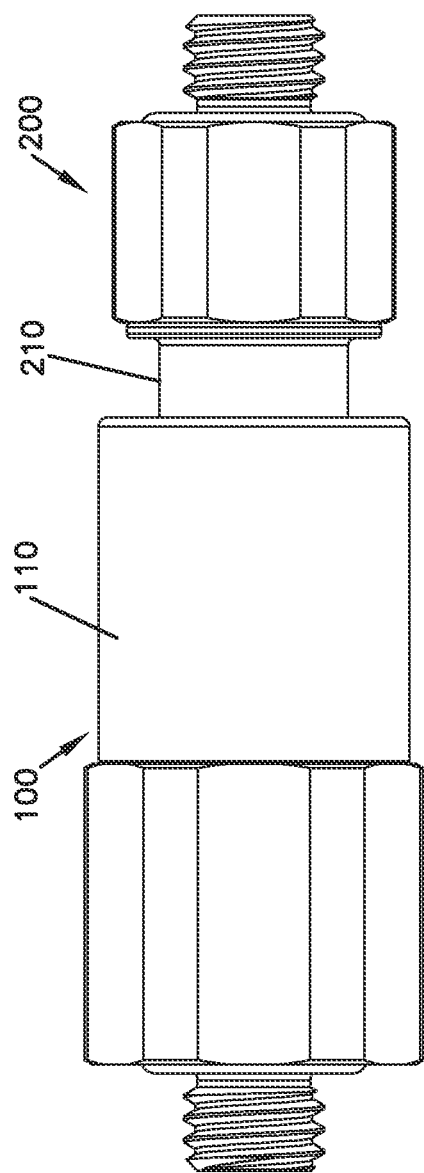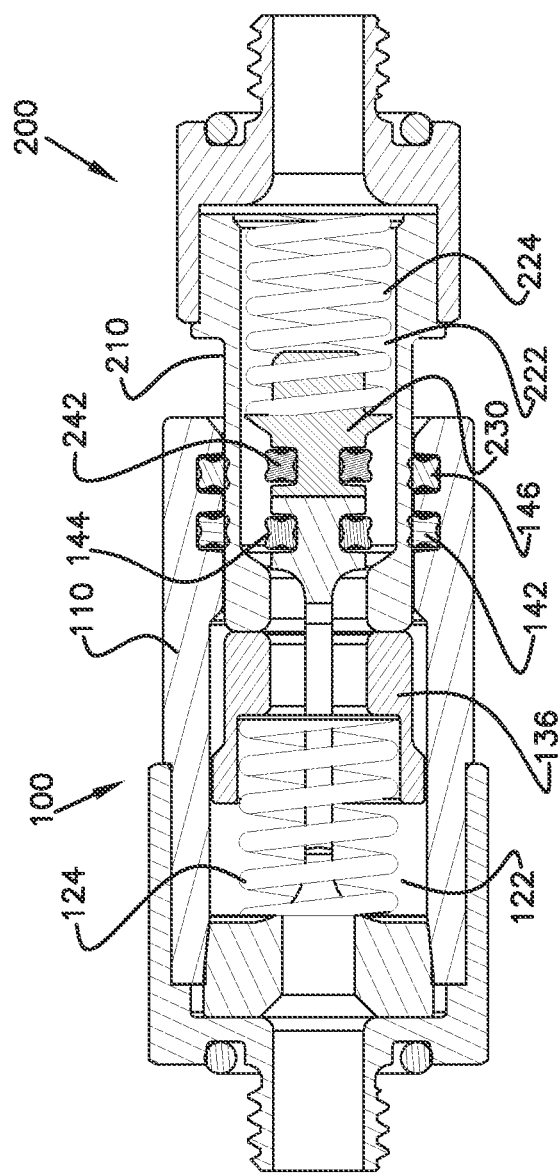

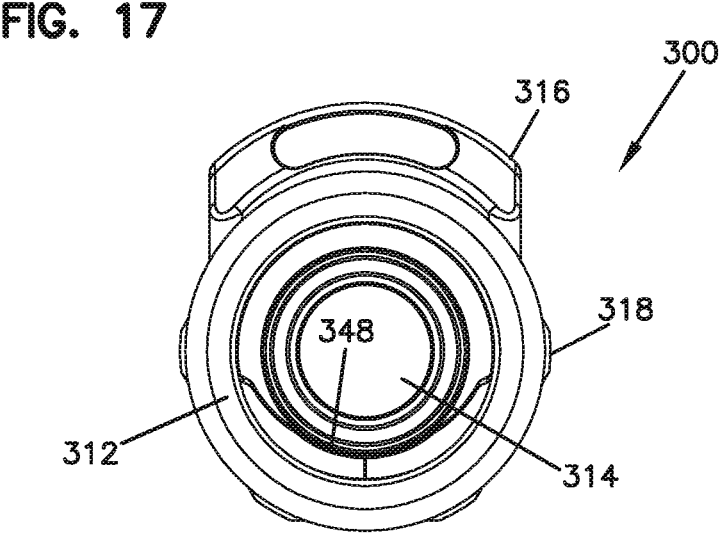
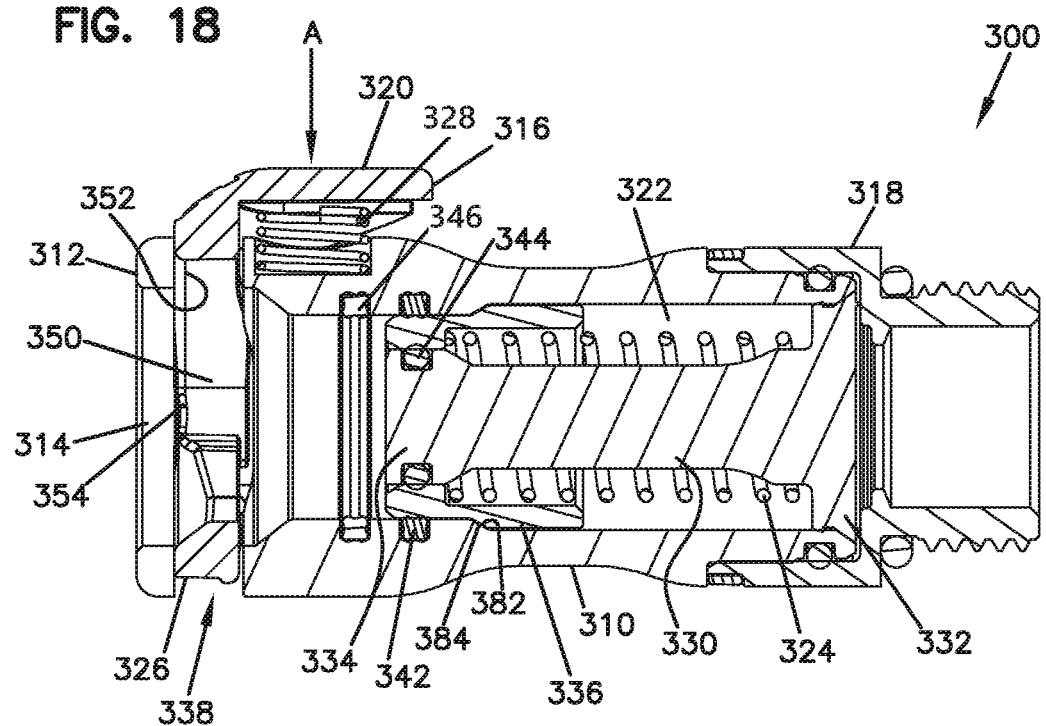

LOW-SPILL COUPLING ASSEMBLY

CROSS-REFERENCE TO RELATED APPLICATIONS

This patent application is a continuation-in-part of U.S. patent application Ser. No. 14/212,322 filed on Mar. 14, 2014, which is a nonprovisional application of and claims priority to U.S. Provisional Application No. 61/799,612 filed on Mar. 15, 2013, the disclosures of which are expressly incorporated herein by reference.

BACKGROUND

Coupling assemblies typically include female and male couplings that are connected to create a fluid flow path therebetween. Such coupling assemblies can be used in various applications, including biomedical applications, beverage dispensing, instrument connections, photochemical handling, liquid cooling of electronics, ink handling, and others.

SUMMARY

In one aspect, a coupling system includes: a female coupling device, the female coupling device including a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; and a third seal that is positioned at the opening of the main body. The coupling system includes: a male coupling device, the male coupling device including a second main body with a second front face, the second front face defining a second opening leading into a second fluid passageway; a valve member and a second spring positioned within the second fluid passageway; and a major seal that seals between the second main body and the valve member. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

In another aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; and a third seal that is positioned at the opening of the main body to seal against a mating male coupling device. The male coupling device is capable of being inserted into the opening of the main body of the female coupling device.

In a further aspect, a female coupling device includes: a main body having a front face, the front face defining an opening leading into a fluid passageway; a stem having a stem head positioned within a sleeve; a spring positioned about the stem that biases the sleeve into a closed position; a first seal that seals between the main body and the sleeve; a second seal that seals between the sleeve and the stem head; a third seal that is positioned at the opening of the main body to seal against a mating male coupling device; and a clip member slidably mounted on the female coupling device, the clip member slidable between a coupled position wherein the clip member engages the mating male coupling device and a uncoupled position wherein the clip member is disengaged from the mating male coupling device.

A further aspect still relates to a coupling system including: a female coupling device, the female coupling device including: a first main body with a first front face, the first front face defining a first opening leading into a first fluid passageway; a stem having a stem head positioned within a sleeve; a first spring positioned about the stem that biases the sleeve into a closed position; a first seal that seals between the main body and the sleeve; a second seal that seals between the sleeve and the stem head; a third seal that is positioned at the opening of the main body; and a clip member slidably mounted on the female coupling device. The coupling system includes a male coupling device, the male coupling device including: a second main body with a second front face, the second front face defining a second opening leading into a second fluid passageway; a valve member and a second spring positioned within the second fluid passageway; and a major seal that seals between the second main body and the valve member. The clip member is slidable between a coupled position where the clip member engages the male coupling device and an uncoupled position where the clip member is disengaged from the male coupling device. The second main body of the male coupling device is capable of being inserted into the first opening of the first main body of the female coupling device so that the first seal and the third seal of the female coupling device engage the second main body of the male coupling device. The sleeve and the valve member are displaced against the first and second springs such that the second seal and the major seal are disengaged so that fluid flows through the first and second fluid passageways.

DESCRIPTION OF THE DRAWINGS

Reference is now made to the accompanying drawings, which are not necessarily drawn to scale.

FIG. 9 is a side view of a coupling assembly including the female and male coupling devices in a pre-coupled position.

FIG. 10 is a cross-sectional view of the female and male coupling devices of FIG. 9.

FIG. 11 is a side view of the female and male coupling devices in a partially-coupled position.

FIG. 12 is a cross-sectional view of the female and male coupling devices of FIG. 11.

FIG. 17 is an end view of the female coupling device of FIG. 15.

FIG. 18 is a cross-sectional view of the female coupling device of FIG. 15.

DETAILED DESCRIPTION

Figure 1:
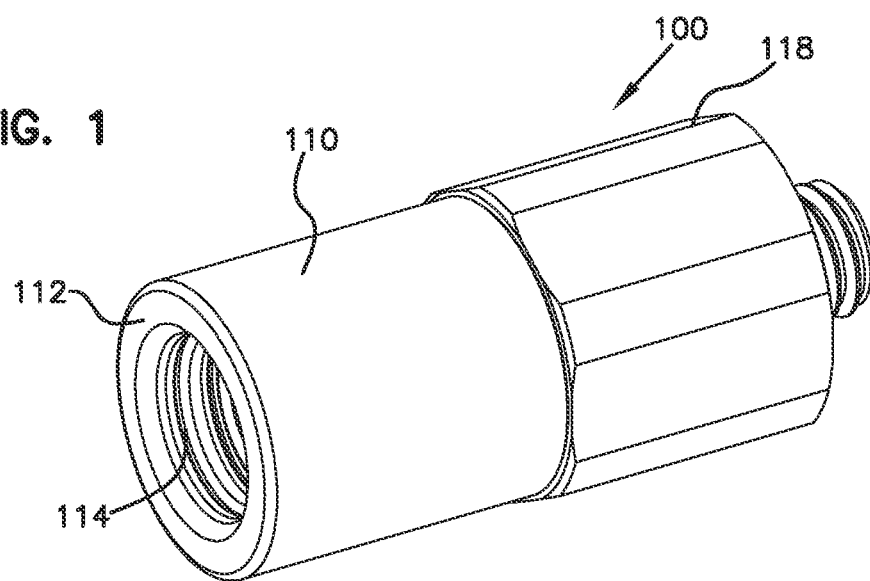
FIG. 1 is a perspective of an example female coupling device.
Figure 2:
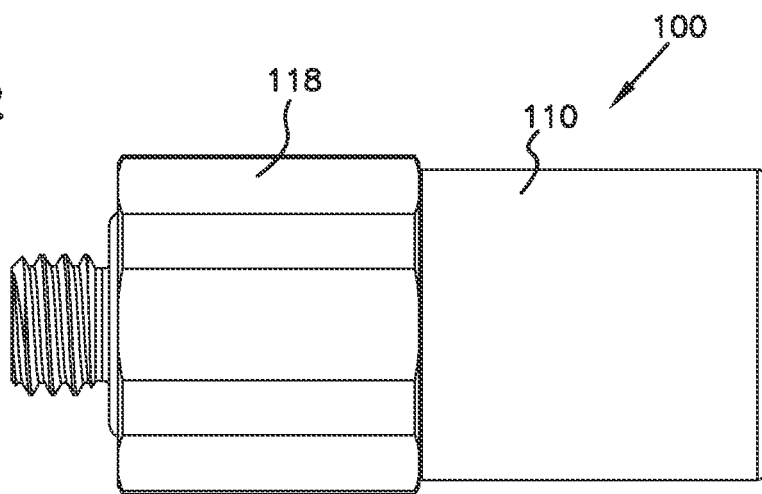
FIG. 2 is a side view of the female coupling device of FIG. 1.
Figure 3:
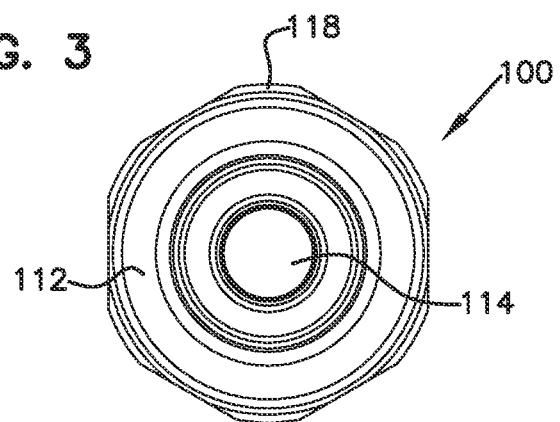
FIG. 3 is an end view of the female coupling device of FIG. 1.
Figure 4:
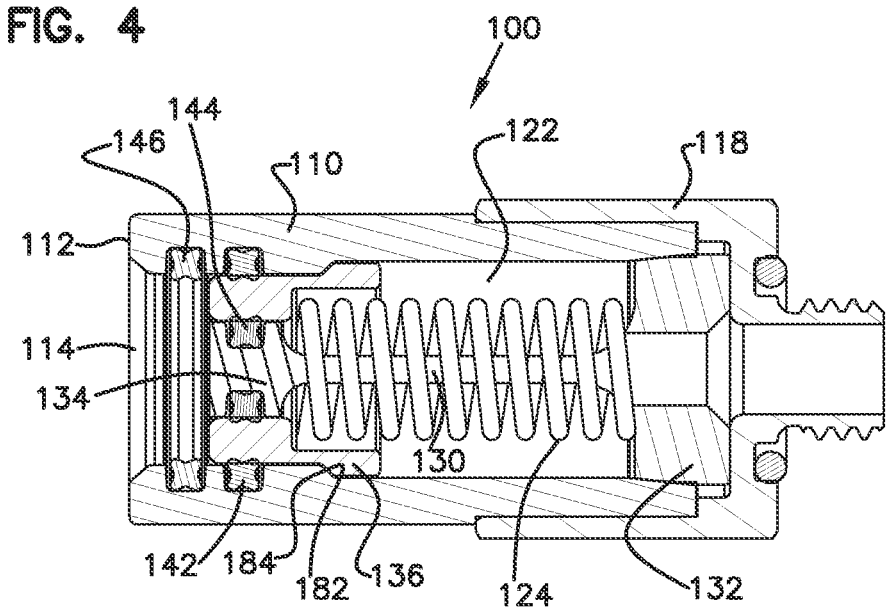
FIG. 4 is a cross-sectional view of the female coupling device of FIG. 1.
Figure 8:
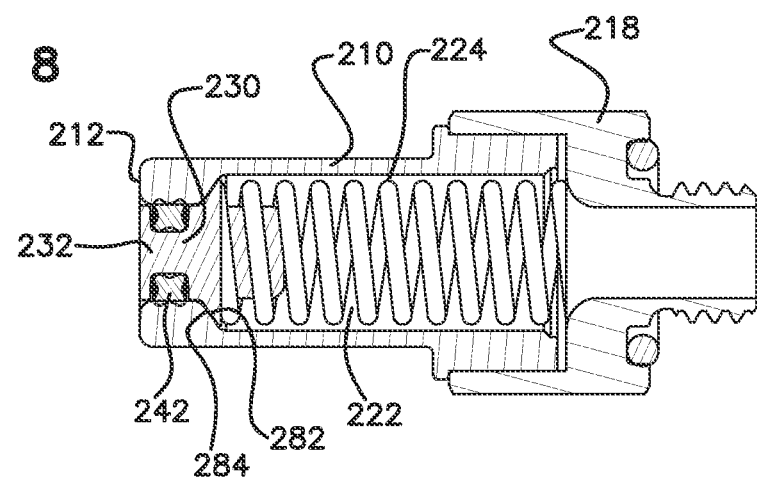
FIG. 8 is a cross-sectional view of the male coupling device of FIG. 5.
Figure 5:
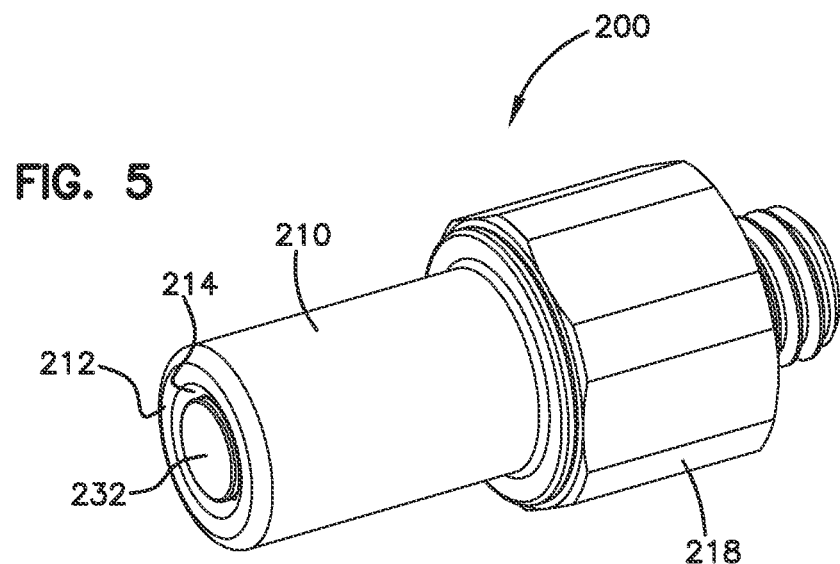
FIG. 5 is a perspective of an example male coupling device.
Figure 6:
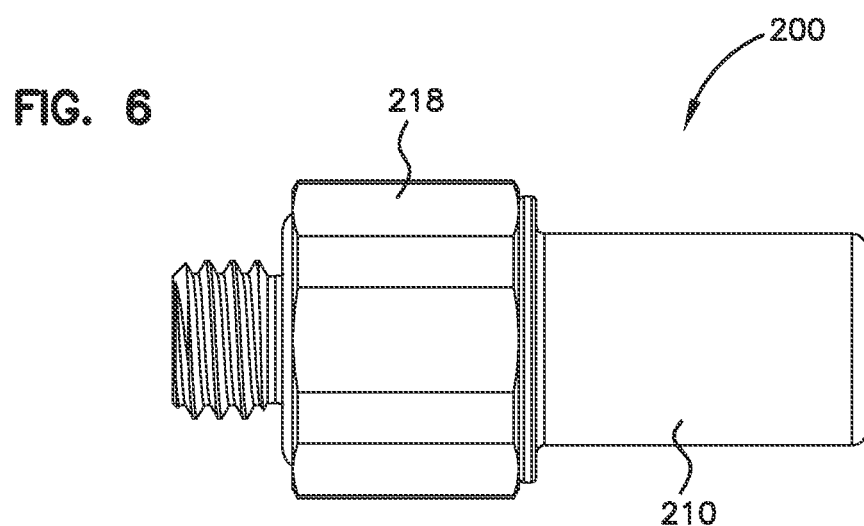
FIG. 6 is a side view of the male coupling device of FIG. 5.
Figure 7:
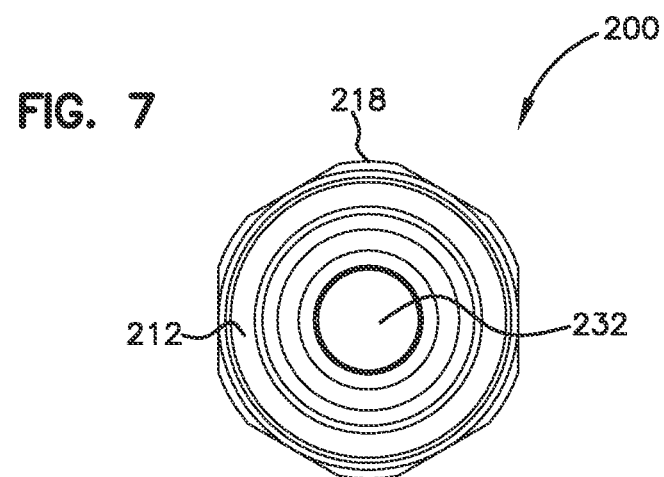
FIG. 7 is an end view of the male coupling device of FIG. 5.

The present disclosure relates to a low-spill coupling assembly including a female coupling device and a male coupling device. Additional details are provided below.

Referring now to FIGS. 1-4, an example female coupling device 100 is shown.

The female coupling device 100 includes a main body 110 having a front face 112. The front face 112 defines an opening 114 leading into a fluid passageway 122.

The female coupling device 100 also includes a termination 118 coupled to the main body 110 using known techniques, such as sonic welding, staking, press-fitting, and threading. The termination 118 is configured to be coupled to another component, such as a fluid line or device.

The example female coupling device 100 includes a stem 130, sleeve 136, and spring 124 positioned within the fluid passageway 122.

The stem 130 includes a base end 132 positioned against the termination 116. The stem 130 also includes a stem head 134 positioned within the sleeve 136. The spring 124 is positioned about the stem 130 and biases the sleeve 136 into the closed position shown in FIG. 4. In this position, a shoulder 182 on the sleeve 136 engages a surface 184 formed by the main body 110 to limit further travel of the sleeve 136 in a direction toward the front face 112.

In this position, a first seal 142 provides a seal between the main body 110 and the sleeve 136. In addition, a second seal 144 provides a seal between the sleeve 136 and the stem head 134. These seals limit movement of fluid through the fluid passageway 122.

A further third seal 146 is positioned at the opening 114 of the main body 110 to seal against a mating male coupling device 200, described below.

Referring now to FIGS. 5-8, the male coupling device 200 is shown.

The male coupling device 200 includes a main body 210 having a front face 212. The front face 212 defines an opening 214 leading into a fluid passageway 222.

The male coupling device 200 also includes a termination 218 coupled to the main body 210 using known techniques, such as sonic welding or staking The termination 218 is configured to be coupled to another component, such as a fluid line.

The example male coupling device 200 includes a valve member 230 and spring 224 positioned within the fluid passageway 222. The spring 224 is biases the valve member 230 into the closed position shown in FIG. 8. A front surface 232 of the valve member 230 is exposed at the front face 212 of the main body 210. In this position, a shoulder 282 on the valve member 230 engages a surface 284 formed by the main body 210 to limit further travel of the valve member 230 in a direction toward the front face 212.

In this position, a first seal 242 provides a seal between the main body 210 and the valve member 230. The seal limits movement of fluid through the fluid passageway 222.

Referring now to FIGS. 9-10, the female coupling device 100 and the male coupling device 200 are shown in a pre-coupled position. In this position, the main body 210 of the male coupling device 200 is partially inserted into the opening 114 of the main body 110 of the female coupling device 100.

In this position, the front surface 232 of the valve member 230 engages the stem head 134. In addition, the front face 212 engages the sleeve 136. Further, the third seal 146 seals against the main body 210 of the male coupling device 200 so that a fluid-tight configuration is created.

Referring now to FIGS. 11-12, the female coupling device 100 and the male coupling device 200 are shown in a partially-coupled position. In this position, the main body 210 of the male coupling device 200 is more-completely inserted into the opening 114 of the main body 110 of the female coupling device 100.

As this occurs, the main body 210 of the male coupling device 200 is positioned in the fluid passageway 122 so that both seals 142, 146 engage the main body 210. Further, both the sleeve 136 and the valve member 230 are displaced against the springs 124, 224, respectively. When this occurs, the seals 144, 242 are disengaged so that fluid can start to flow through the fluid passageways 122, 222.

Figure 13:
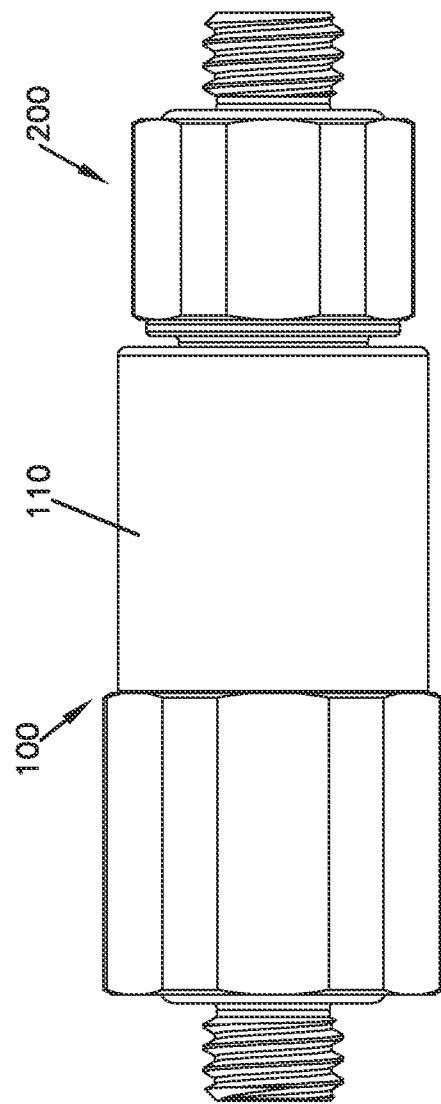
FIG. 13 is a side view of the female and male coupling devices in a fully-coupled position.
Figure 14:
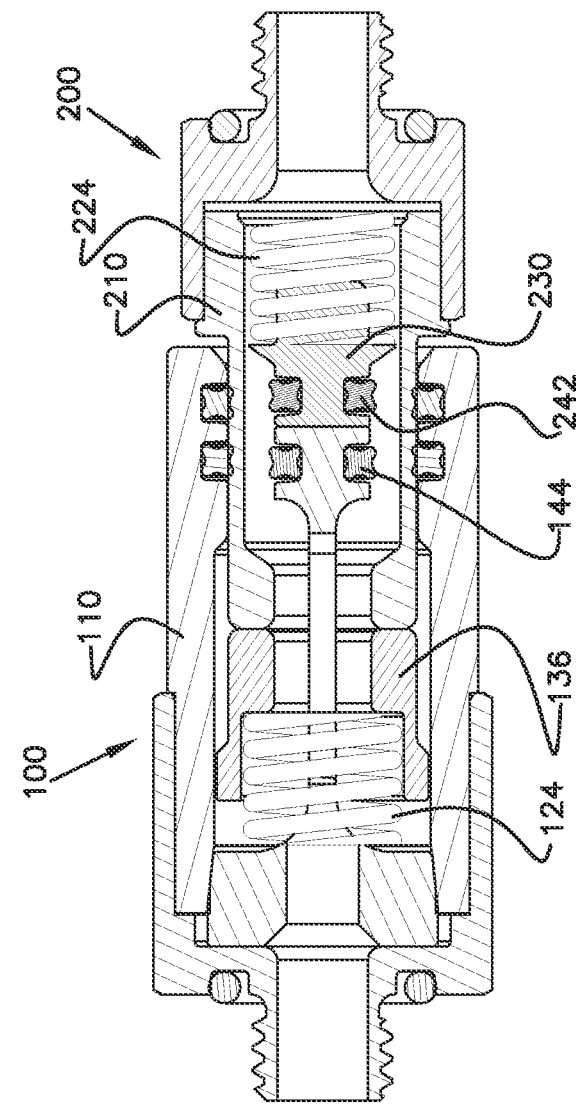
FIG. 14 is a cross-sectional view of the female and male coupling devices of FIG. 13.

Referring now to FIGS. 13-14, the female coupling device 100 and the male coupling device 200 are shown in a fully-coupled position. In this position, the main body 210 of the male coupling device 200 is completely inserted into the opening 114 of the main body 110 of the female coupling device 100.

Both of the springs 124, 224 are compressed, and the sleeve 136 and valve member 230 are further displaced. This assures that seals 144, 242 are fully disengaged so that fluid can pass through the fluid passageways 122, 222.

To release, the male coupling device 200 is pulled out of the female coupling device 100. When this occurs, the springs 124, 224 return the sleeve 136 and the valve member 230 to the resting positions shown in FIGS. 9-10.

Referring now to FIGS. 15-18, another example female coupling device 300 is shown.

The female coupling device 300 includes a main body 310 having a front face 312 and a maximum circumferential surface 313. The front face 312 defines an opening 314 leading into a fluid passageway 322 (see FIG. 18).

The female coupling device 300 also includes a termination 318 coupled to the main body 310 using known techniques, such as sonic welding, staking, press-fitting, and threading. The termination 318 is configured to be coupled to another component, such as a fluid line or device. The female coupling device 300 includes a locking collar, herein referred to as a quick connecting/disconnecting clip member 316, which is used to quickly disconnect and connect the female coupling device 300 with another component.

The example female coupling device 300 includes a stem 330, sleeve 336, and spring 324 positioned within the fluid passageway 322. The stem 330 includes a base end 332 positioned against the termination 318. The stem 330 also includes a stem head 334 positioned within the sleeve 336. The spring 324 is positioned about the stem 330 and biases the sleeve 336 into the closed position shown in FIG. 18. In this position, a shoulder 382 on the sleeve 336 engages a surface 384 formed by the main body 310 to limit further travel of the sleeve 336 in a direction toward the front face 312. In this position, a first seal 342 provides a seal between the main body 310 and the sleeve 336. In addition, a second seal 344 provides a seal between the sleeve 336 and the stem head 334. These seals limit movement of fluid through the fluid passageway 322. A further third seal 346 is positioned at the opening 314 of the main body 310 to seal against a mating male coupling device 400, as described below.

Figure 15:
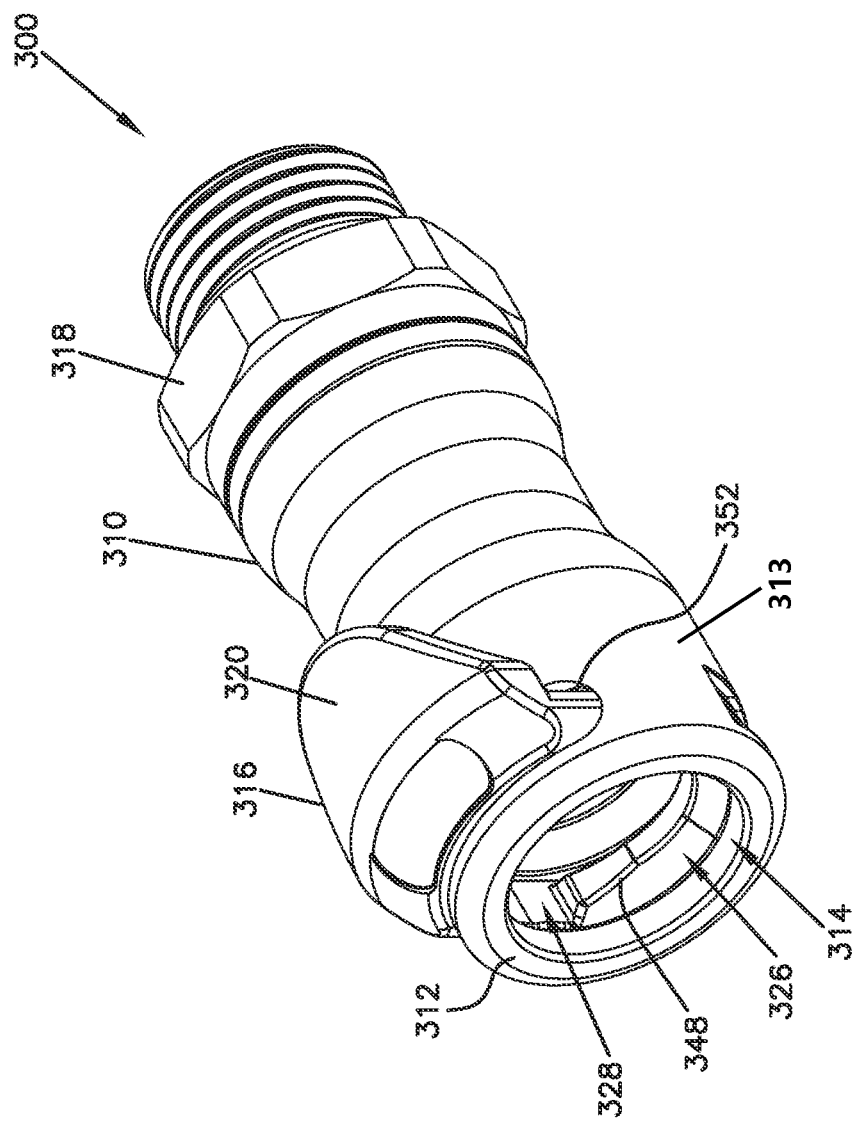
FIG. 15 is a perspective view of another example female coupling device.
Figure 16:
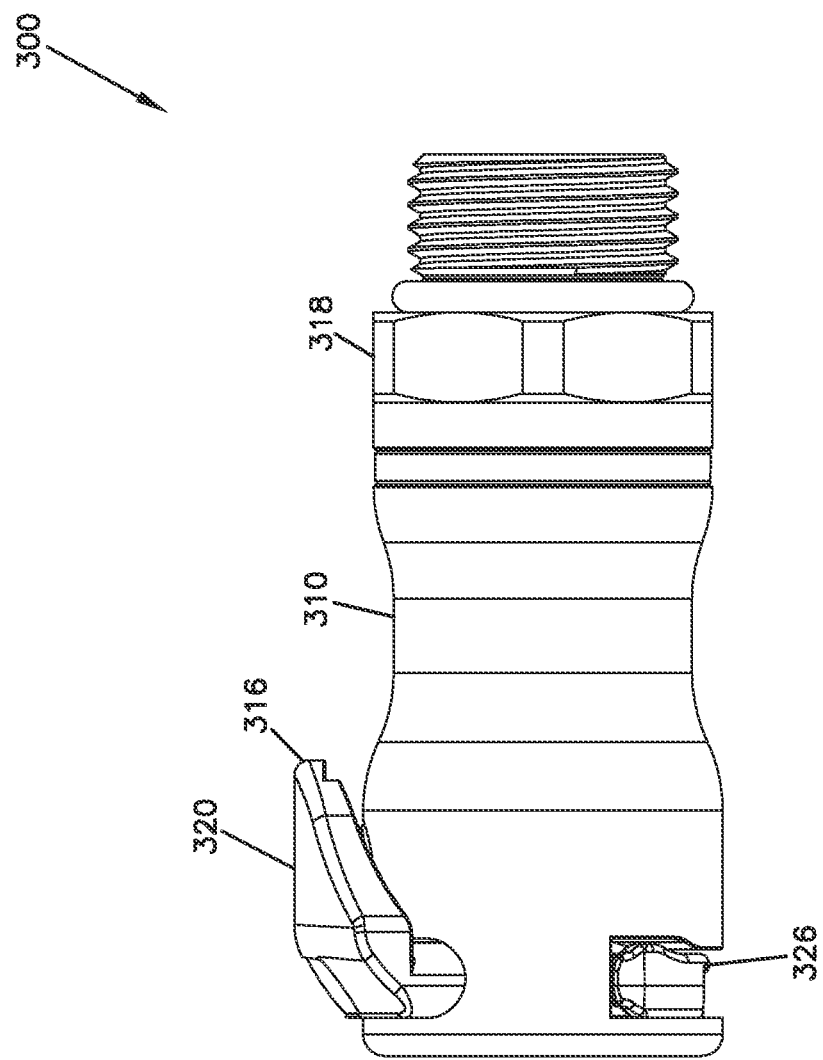
FIG. 16 is a side view of the female coupling device of FIG. 15.
Figure 19:
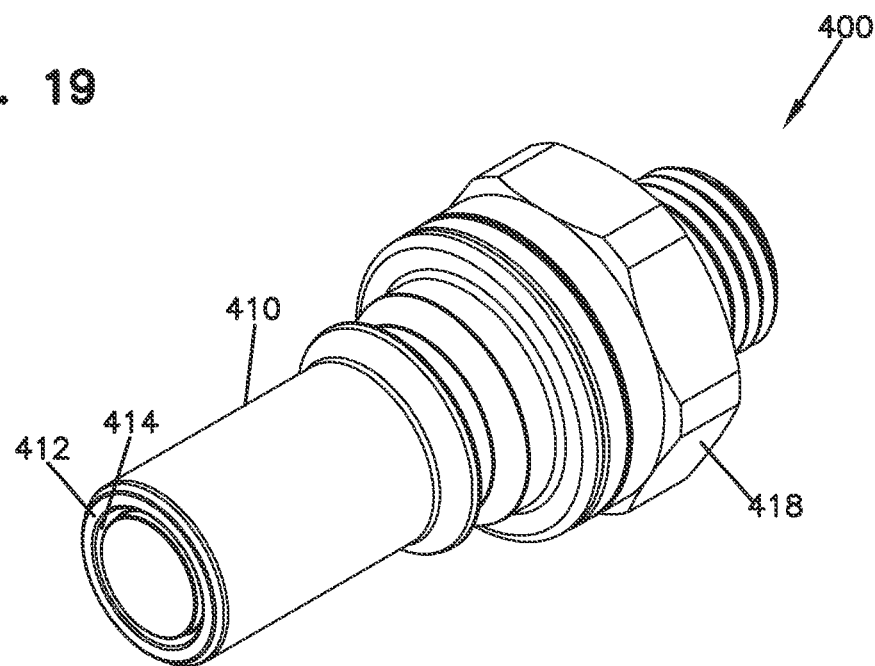
FIG. 19 is a perspective view of another example male coupling device.
Figure 20:
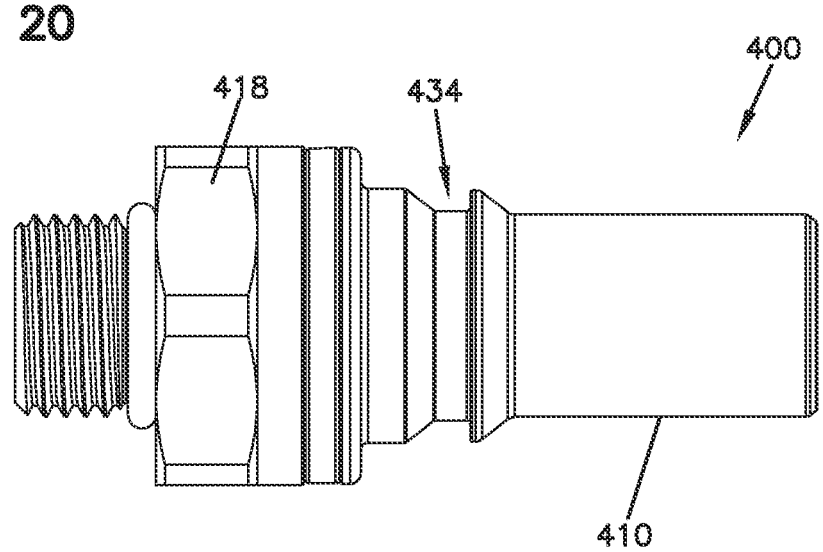
FIG. 20 is a side view of the male coupling device of FIG. 19.
Figure 21:
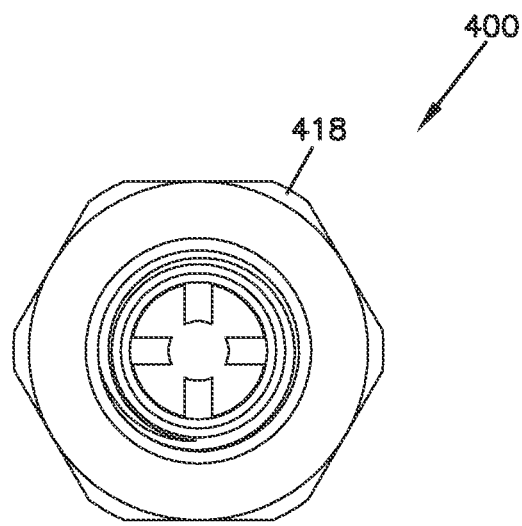
FIG. 21 is an end view of the male coupling device of FIG. 19.
Figure 22:
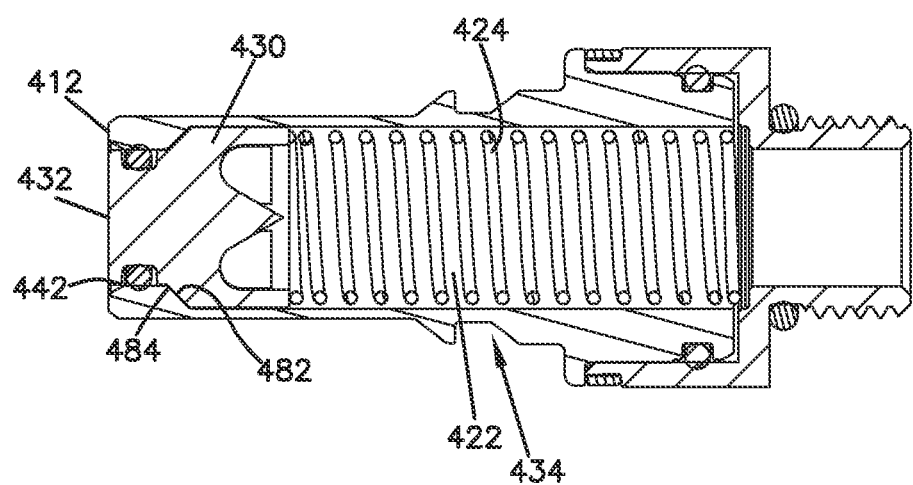
FIG. 22 is a cross-sectional view of the male coupling device of FIG. 19.

In the depicted example, the clip member 316 includes a tab portion 320 and a plate portion 326 interconnected to each other at roughly a right angle in a generally L-shaped configuration. In FIG. 15, the clip member 316 is in a resting or locking position. The clip member 316 can be biased or forced into the locked position using an integral cantilever or spring 328 (see FIG. 18). The clip member 316 is moved in a direction A within an opening 338 of the main body 310 to an unlocked position. The clip member 316 can be moved to this position to, for example, connect or release another component, such as, an insert.

The tab portion 320 of the clip member 316 provides a surface for the user to press down on the clip member 316 so as to place the clip member 316 in the uncoupled position when inserting the mating male coupling device 400. In some examples, it is not necessary to manually force down on the clip member 316 when inserting the mating male coupling device 400 as the mating male coupling device 400 upon engagement with an inner lip 348 (see FIG. 15) of the plate portion 326 will force the clip member 316 down into the uncoupled position. The plate portion 326 defines an aperture 350 (see FIG. 18) sufficiently large to allow the mating male coupling device 400 to extend partially therethrough and is generally alignable with the fluid passageway 322 of the female coupling device 300. The plate portion 326 slides in a slot 352 extending transversely of the female coupling device 300.

In one example, side surfaces of the female coupling device 300 can include a shoulder portion and the plate portion 326 of the clip member 316 can include barbed projections along its side edge. The barbed projections can have a substantially flat portion for engaging the shoulder portion of the female coupling device 300 so as to prevent the clip member 316 from being inadvertently removed from the female coupling device 300 after it has been inserted. This assures that the clip member 316 will remain with the female coupling device 300 at all times in typical use.

Referring now to FIGS. 19-22, the male coupling device 400 is shown.

The male coupling device 400 includes a main body 410 having a front face 412. The front face 412 defines an opening 414 leading into a fluid passageway 422 (see FIG. 22).

The male coupling device 400 also includes a termination 418 coupled to the main body 410 using known techniques, such as sonic welding or staking The termination 418 is configured to be coupled to another component, such as a fluid line.

The example male coupling device 400 includes a valve member 430 and spring 424 positioned within the fluid passageway 422. The spring 424 biases the valve member 430 into the closed position shown in FIG. 22. A front surface 432 of the valve member 430 is exposed at the front face 412 of the main body 410. In this position, a shoulder 482 on the valve member 430 engages a surface 484 formed by the main body 410 to limit further travel of the valve member 430 in a direction toward the front face 412.

In this position, a first seal 442 (e.g., major seal) provides a seal between the main body 410 and the valve member 430. The seal limits movement of fluid through the fluid passageway 422.

Figure 23:
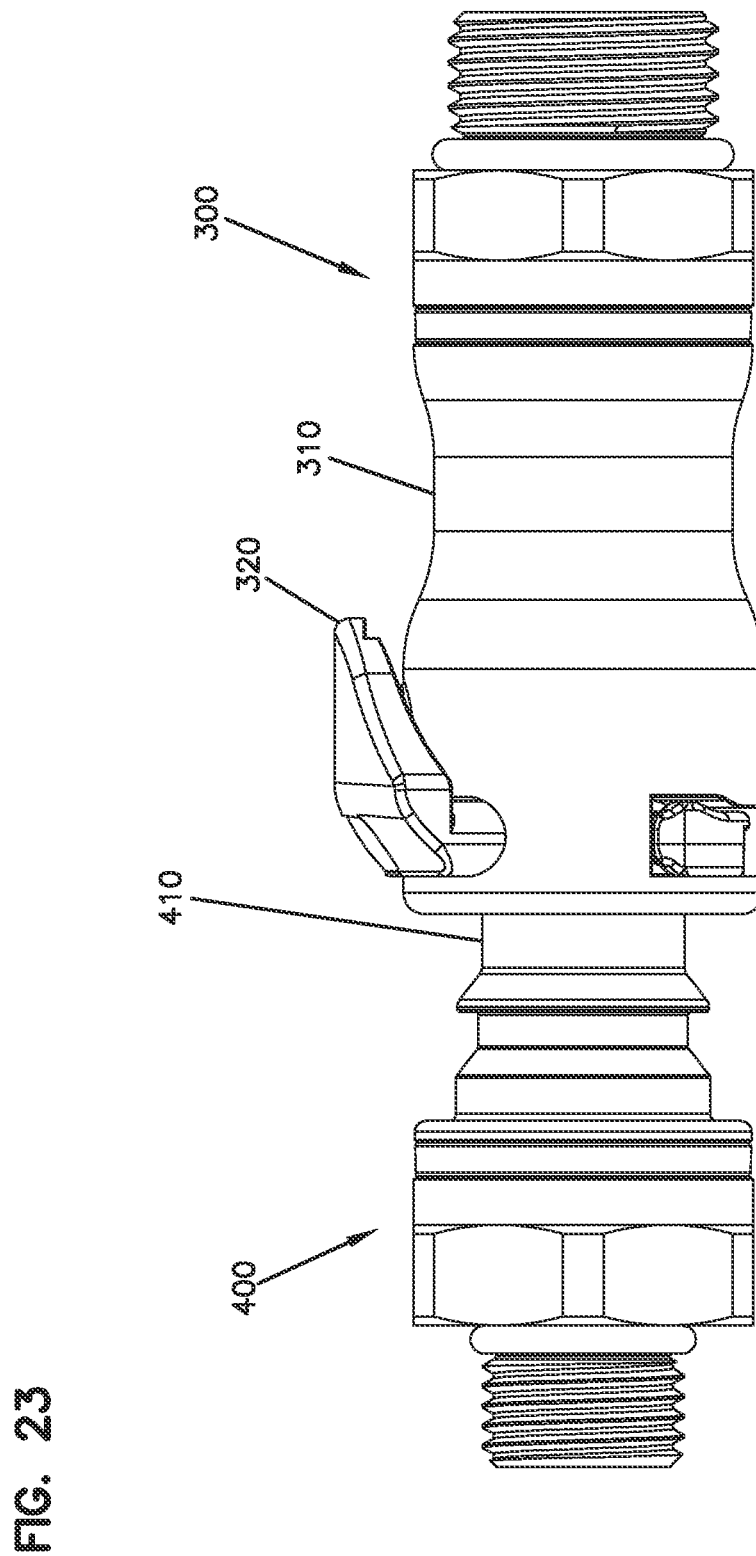
FIG. 23 is a side view of a coupling assembly including the female and male coupling devices shown in FIGS. 15 and 19 in a pre-coupled position.
Figure 24:
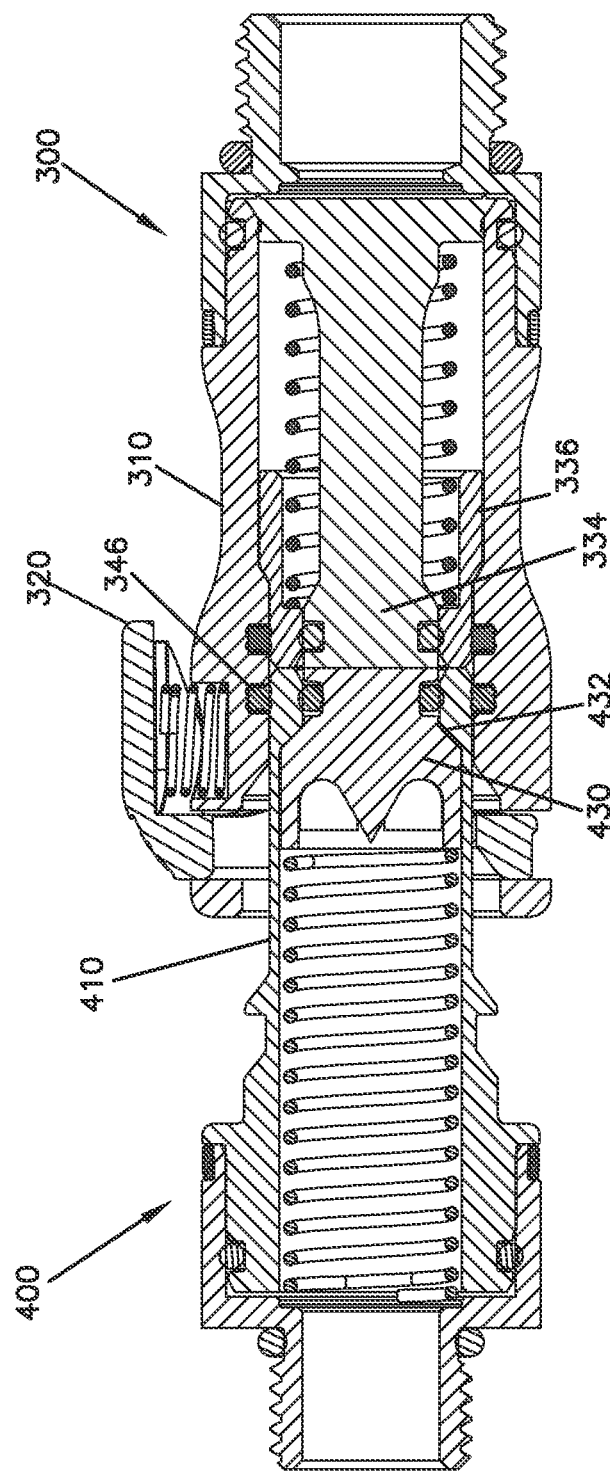
FIG. 24 is a cross-sectional view of the female and male coupling devices of FIG. 23.

Referring now to FIGS. 23-24, the female coupling device 300 and the male coupling device 400 are shown in a pre-coupled position. In this position, the main body 410 of the male coupling device 400 is partially inserted into the opening 314 of the main body 310 of the female coupling device 300.

In this position, the front surface 432 of the valve member 430 engages the stem head 334. In addition, the front face 432 engages the sleeve 336. Further, the third seal 346 seals against the main body 410 of the male coupling device 400 so that a fluid-tight configuration is created.

Figure 25:
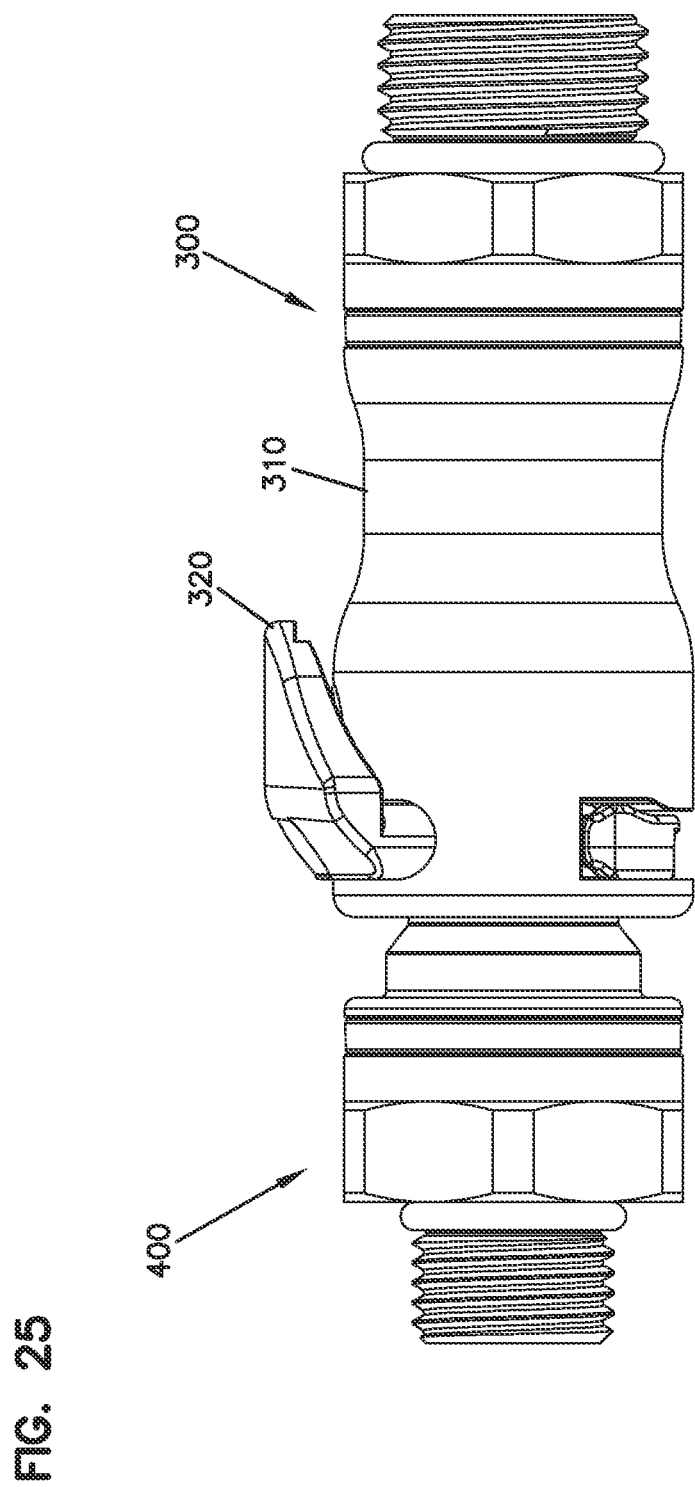
FIG. 25 is a side view of the female and male coupling devices shown in FIGS. 15 and 19 in a partially-coupled position.
Figure 26:
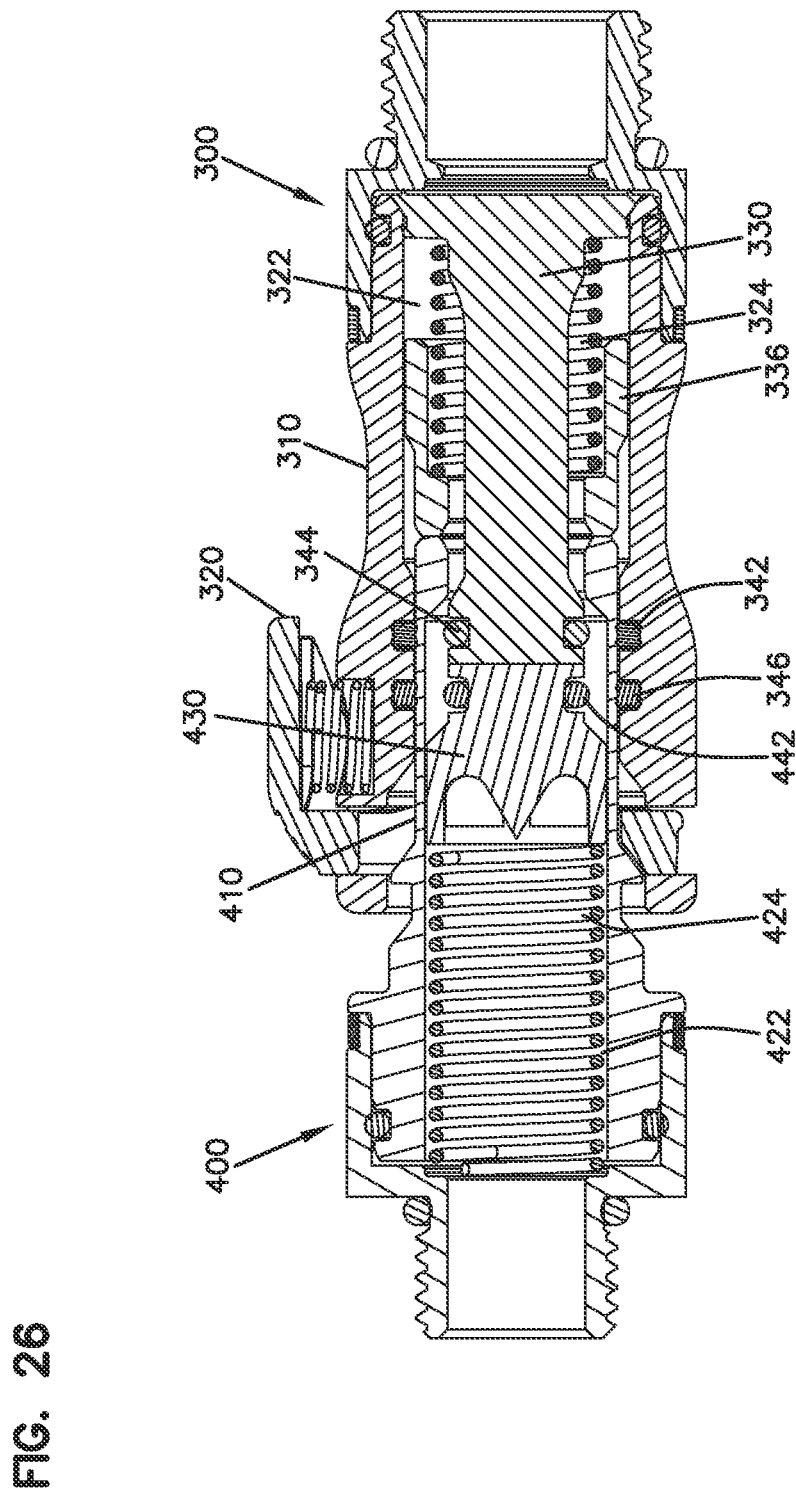
FIG. 26 is a cross-sectional view of the female and male coupling devices of FIG. 25.

Referring now to FIGS. 25-26, the female coupling device 300 and the male coupling device 400 are shown in a partially-coupled position. In this position, the main body 410 of the male coupling device 400 is more-completely inserted into the opening 314 of the main body 310 of the female coupling device 300.

As this occurs, the main body 410 of the male coupling device 400 is positioned in the fluid passageway 322 so that both seals 342, 346 engage the main body 410. Further, both the sleeve 336 and the valve member 430 are displaced against the springs 324, 424, respectively. When this occurs, the seals 344, 442 are disengaged so that fluid can start to flow through the fluid passageways 322, 422.

Figure 27:
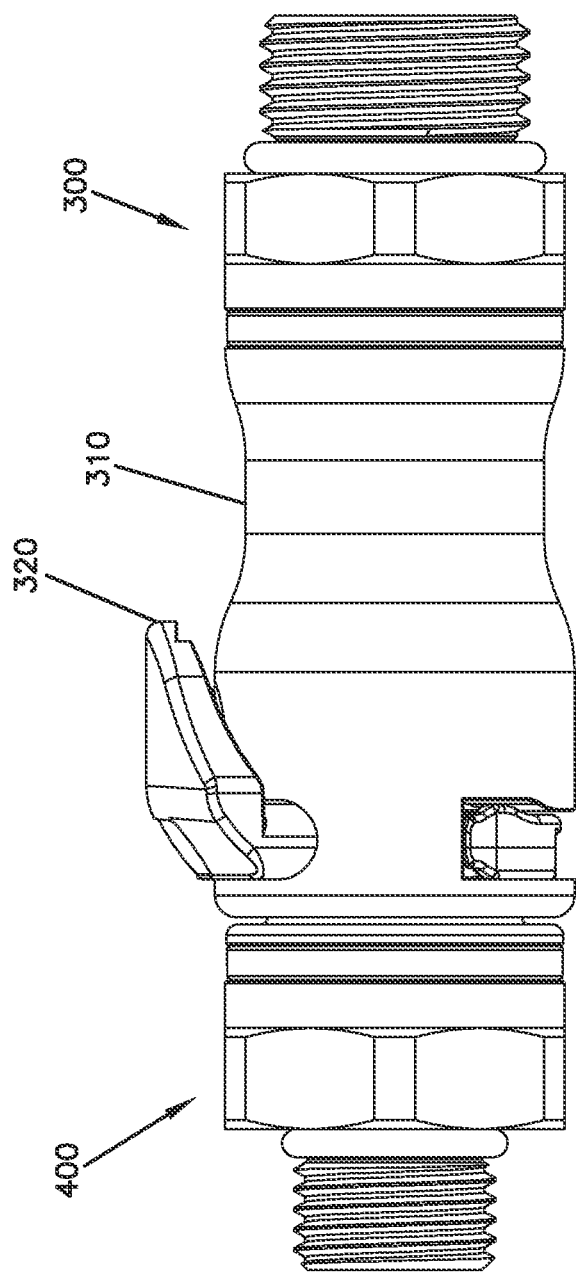
FIG. 27 is a side view of the female and male coupling devices shown in FIGS. 15 and 19 in a fully-coupled position.
Figure 28:
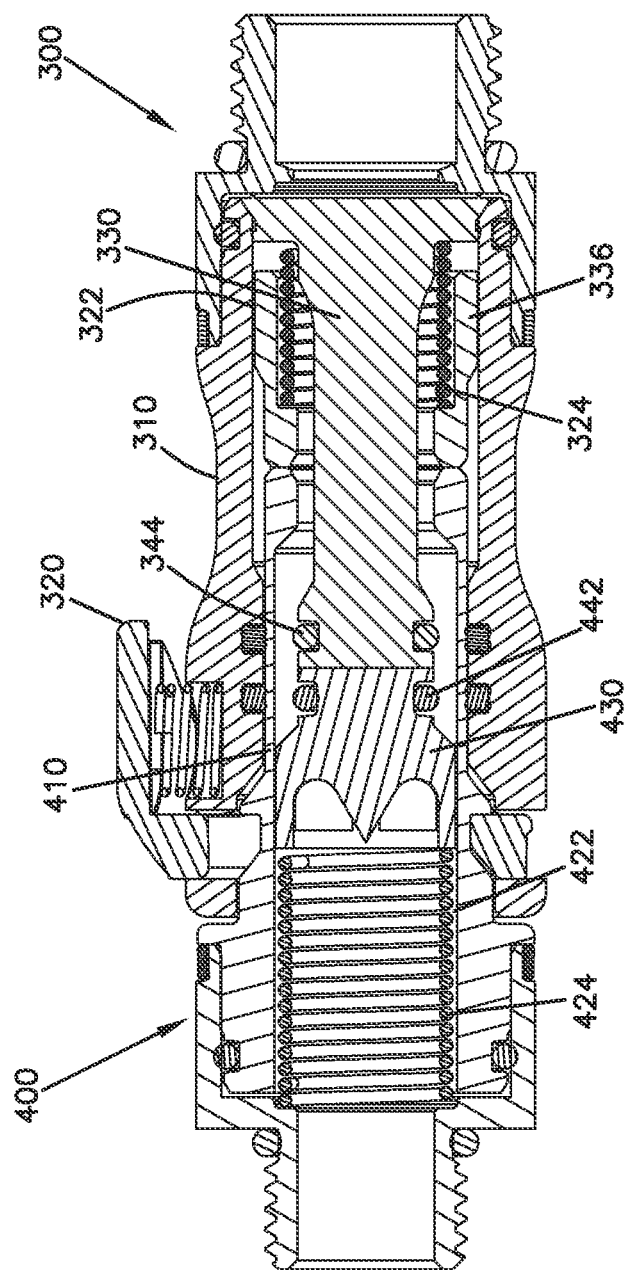
FIG. 28 is a cross-sectional view of the female and male coupling devices of FIG. 27.

Referring now to FIGS. 27-28, the female coupling device 300 and the male coupling device 400 are shown in a fully-coupled position. In this position, the main body 410 of the male coupling device 400 is completely inserted into the opening 314 of the main body 310 of the female coupling device 300.

Both of the springs 324, 424 are compressed, and the sleeve 336 and valve member 430 are further displaced. This assures that seals 344, 442 are fully disengaged so that fluid can pass through the fluid passageways 322, 422.

To release, the male coupling device 400 is pulled out of the female coupling device 300. When this occurs, the springs 324, 424 return the sleeve 336 and the valve member 430 to the resting positions shown in FIGS. 23-24.

In certain examples, the spring 328 (e.g., resilient biasing member) is disposed below the tab portion 320. Upon pressing down on the clip member 316, the spring 328 is displaced from its at rest position to a displaced position. The clip member 316 is then biased upwardly such that the plate portion 326 rests in a circumferential groove 434 of the male coupling device 400 when in the coupled position. In other words, the clip member 316 is biased upwardly such that when the circumferential groove 434 of the male coupling device 400 is aligned with the inner lip 348 of the plate portion 326 of the clip member 316, the spring 328 will force the clip member 316 upward into engagement with the circumferential groove 434 thereby placing the clip member 316 into the coupled position and retaining the male and female coupling devices 300, 400 in a coupled state upon the application of the fluid pressure.

In other examples, by merely inserting the male coupling device 400, the clip member 316 will be forced down into its uncoupled position thereby doing away with the need for the user to press down on the tab portion 320 of the clip member 316. To uncouple the coupling the user simply presses down on the clip member 16 and removes the male coupling device 400.

Additional details about an example latched coupling assembly are provided in U.S. Pat. No. 7,547,047 to deCler et al. and U.S. Pat. No. 5,104,158 to Meyer et al., the entirety of which are hereby incorporated by reference.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A coupling system, the system comprising:
a female coupling device and a male coupling device releasably attachable together when transitioning from a pre-coupled position, to a partially-coupled position, and to a fully-coupled position that provides a fluid flow path between a first fluid passageway of the female coupling device and a second fluid passageway of the male coupling device;
wherein the female coupling device includes: a first main body defining a maximum exterior circumferential surface of the female coupling device, a first front face defining a first circular opening of the female coupling device, and a first interior bore having a first bore diameter extending along a longitudinal axis; a first termination body connected to a rear end of the first main body opposite from the first front face; first, second, third, and fourth seals carried by the female coupling device; a sleeve that is longitudinally slideable within the first interior bore of the first main body and that is spring biased to releasably engage with the first seal seated in a first groove of the first main body along the first interior bore; a stem having a stem head retained in a fixed orientation relative to the first circular opening such that the second seal mounted to the stem head is positioned in a same axial plane as the first seal, wherein the second seal is configured to seal between the sleeve and the stem head and to disengage from the sleeve when the sleeve longitudinally slides away from the stem head, the stem head defining a stem front face that is oriented toward the first circular opening and that has a diameter greater than half the first bore diameter and less than an innermost interior diameter of the sleeve, wherein the third seal is positioned along the first interior bore at a location radially inward from the maximum exterior circumferential surface of the female coupling device and axially forward of the first and second seals, and the fourth seal is position axially rearward of the first and second seals and in contact with the first termination body; and a quick disconnect clip member having a push tab extending rearwardly from a slider plate such that the slider plate defines a front-most surface of the clip member closest to the first circular opening of the female coupling device, the front-most surface of the clip member being slidably engaged with a slot extending through the maximum exterior circumferential surface of the female coupling device; and
wherein the male coupling device includes: a second main body having a male front end configured to slide within the first interior bore of the female coupling device and engage the sleeve within the first interior bore; a valve member that is longitudinally slideable within the second main body and that is spring biased toward the male front end of the second main body so that a valve seal mounted to the valve member is releasably engageable with the second main body; and a second termination body connected to the second main body opposite from the male front end and engaged with a sixth seal; and a circumferential groove defined in an exterior of the second main body and having a radially extending wall to releasably lock with the plate of the quick disconnect clip member, wherein the second main body of the male coupling device is shaped to simultaneously engage with all three of the first, second, and third seals of the female coupling device during movement from the pre-coupled position toward the partially-coupled position, and wherein the second main body of the male coupling device sealingly engages with the first and third seals of the female coupling device when releasably attached in the fully-coupled position.

2. The system of claim 1, wherein the second main body of the male coupling device is sealingly engaged with the third seal of the female coupling device when the female coupling device and the male coupling device are arranged in the pre-coupled position.

3. The system of claim 2, wherein the male front end of the male coupling device abuts with the sleeve of the female coupling device when the female coupling device and the male coupling device are arranged in the pre-coupled position.

4. The system of claim 3, wherein the valve member of the male coupling device abuts with the stem front face of the stem of the female coupling device when the female coupling device and the male coupling device are arranged in the pre-coupled position.

5. The system of claim 4, wherein the second main body of the male coupling device is sealingly engaged with all three of the first, second, and third seals of the female coupling device when the female coupling device and the male coupling device are transitioning from the pre-coupled position to the partially-coupled position.

6. The system of claim 5, wherein the second main body of the male coupling device is sealingly engaged with the second and third seals of the female coupling device when the female coupling device and the male coupling device are arranged in the partially-coupled position.

7. The system of claim 6, wherein the male front end of the male coupling device urges the sleeve longitudinally rearward within the first interior bore toward the first termination body of the female coupling device when the female coupling device and the male coupling device are arranged in the partially-coupled position.

8. The system of claim 7, wherein the stem front face of the stem of the female coupling device urges the valve member of the male coupling device away from the male front end of the male coupling device when the female coupling device and the male coupling device are arranged in the partially-coupled position.

9. The system of claim 8, wherein the plate of the quick disconnect clip member is spring biased to a releasable locking engagement with the radially extending wall of the circumferential groove of the second main body when the female coupling device and the male coupling device are arranged in the fully-coupled position.

10. The system of claim 9, wherein a laterally outermost surface of the push tab of the quick disconnect clip member is displaceable toward the first main body of the female coupling device to disengage the plate of the quick disconnect clip member from the releasable locking engagement with the radially extending wall of the circumferential groove of the second main body.

11. The system of claim 2, wherein the male front end of the second main body of the male coupling device is aligned with a valve front face of the valve member of the male coupling device when the female coupling device and the male coupling device are arranged in the pre-coupled position.

12. The system of claim 1, wherein the first interior bore defined by the first main body of the female coupling device extends rearward to an interior shoulder that tapers to a larger diameter and that is positioned axially closer to the first front face of the female coupling device than to a rear end of the first main body.

13. The system of claim 12, wherein the first interior bore extends forward of the third seal toward the first front face for a forward axial length, extends between the third seal and the first seal for an intermediate axial length, and extends rearward of the first seal for a rearward axial length to the interior shoulder.

14. The system of claim 13, wherein the forward axial length of the first interior bore of the first main body is greater than the intermediate axial length.

* * * * *